INVENTORS:
HEINZ-GÜNTER EHLUSS
ERICH WESSEL

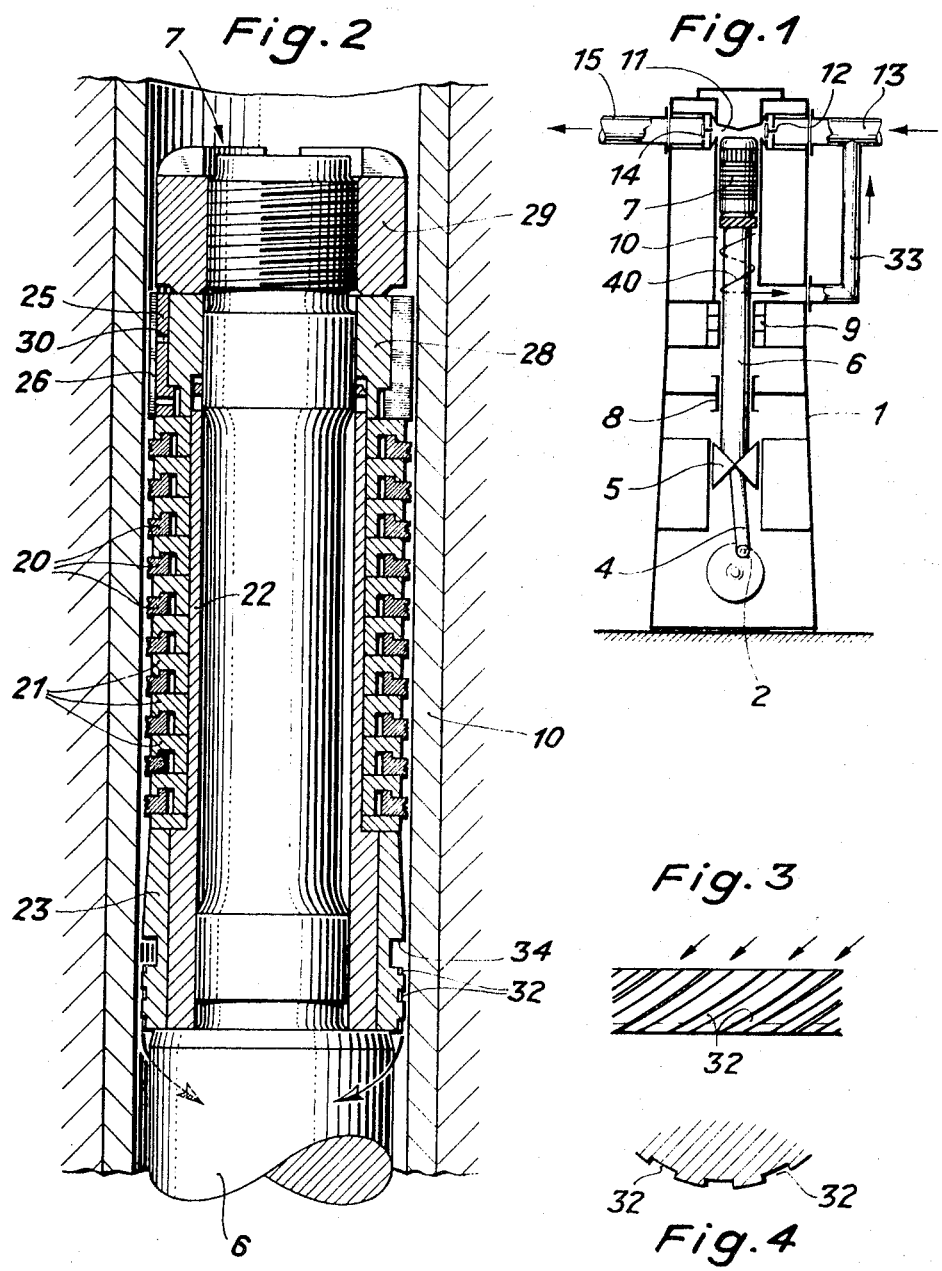

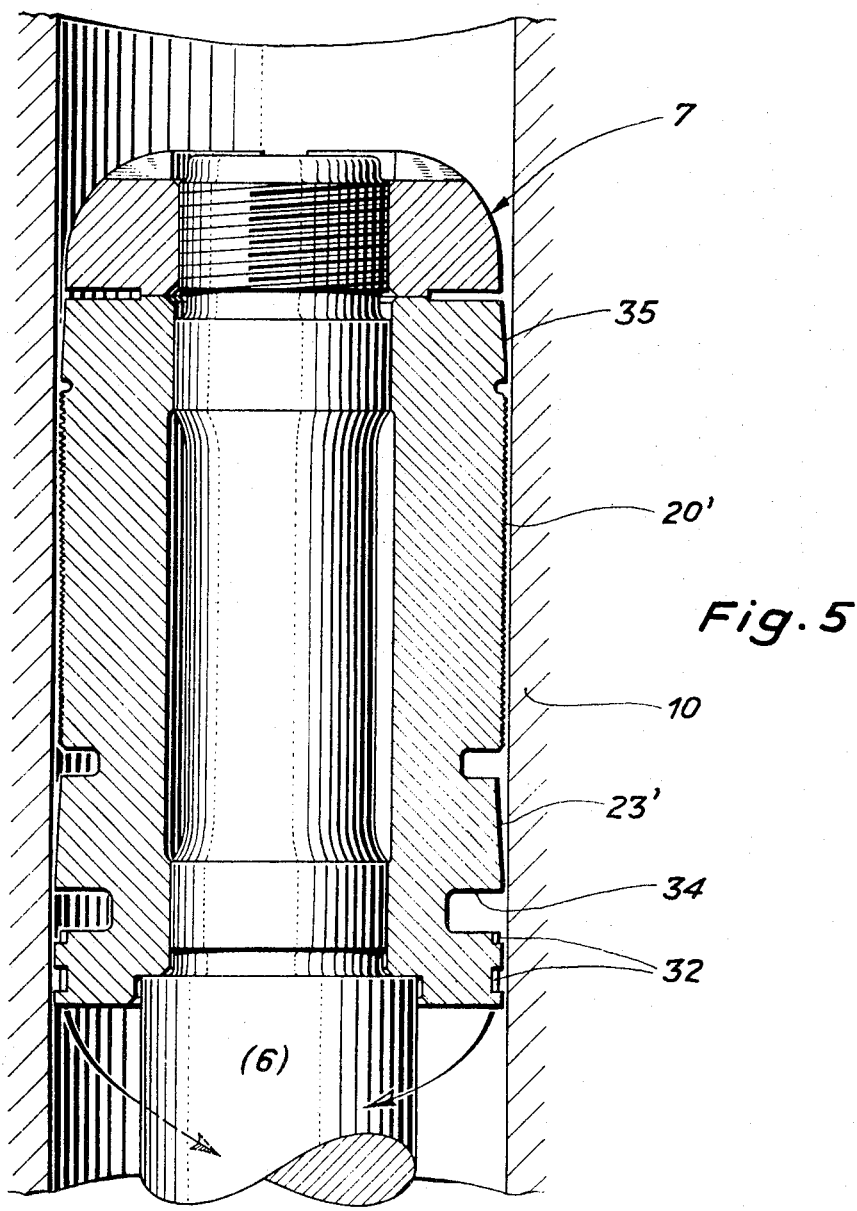

MEANS FOR SPACING A PISTON FROM A CYLINDER DURING OPERATION

This invention relates to piston compressors and, more particularly, to piston compressors having a piston operating in a cylinder without physically contacting the cylinder. Still more particularly, this invention relates to a means for spacing a piston from a cylinder in a piston compressor.

Compressors have been known in which pistons have been spaced from a surrounding cylinder with substantially no physical contact between the piston and cylinder. This spacing apart of the piston from the cylinder has usually been achieved by means of a gas or air bearing. The bearing functions so that in the event that the piston assumes an off-center position, the different gas pressures operative in the gaps of different widths between the piston and the cylinder automatically return the piston to the central position. However, it has been possible in these compressors that the piston rod carrying the piston becomes heated only on one side by a flow of heated gas passing from between the piston and cylinder so that the piston is deflected. As a result of such a deflection, the piston may come into contact with the cylinder so that danger may occur.

Accordingly, it is an object of the invention to prevent contact between a cylinder and a piston which normally are spaced from each other during operation.

It is another object of the invention to use the heated gas flow from a compression chamber of a piston compressor to maintain the piston and cylinder in spaced relation during operation.

It is another object of the invention to provide a simple economical means for maintaining a space between a piston and cylinder during reciprocation of the piston in the cylinder.

Briefly, the invention provides a piston compressor of the type having a piston reciprocable within a cylinder and having substantially no physical contact therewith, with a means for imparting a swirl to a flow of gas passing between the piston and the cylinder. This swirl imparting means is deposed on or near the end of the piston adjacent the piston rod carrying the piston so that the gas flow, for example, from a combustion chamber of the compressor is directed substantially uniformly past the piston rod to provide for a unilateral heating of the piston rod. By reducing or by eliminating completely, the possibility of uneven piston rod heating, contact between the piston and cylinder is reduced to a minimum or is prevented.

The means for imparting the swirl can be formed by a grooved portion or ring on the piston near the piston rod. The grooves of the portion or ring are helically shaped so that the flow of gas is directed into a helically twisted path before passing by the piston rod. Alternatively, the piston can be formed with an enlarged section relative to an annular groove with holes passing through the enlarged section to direct the flow of gas into the area of the piston rod in a swirl.

These and other objects and advantages of the invention will become more apparent from the following detailed description and appended claims taken in conjunction with the accompanying drawings in which:

FIG. 1 illustrates a cross-sectional view of a piston compressor utilizing a swirl imparting means according to the invention;

FIG. 2 illustrates a cross-sectional view of the piston of the compressor of FIG. 1;

FIG. 5 illustrates a view of a modified piston accord-ing to the invention.

Figure 3:
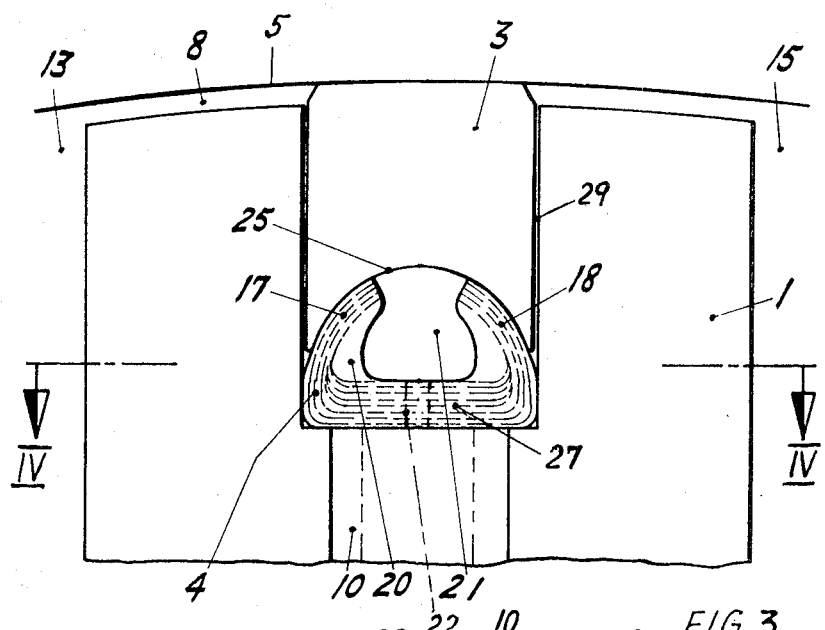
FIG. 3 illustrates an elevational view of the grooves of the swirling imparting means.

Referring to FIG. 1, the single stage compressor has a casing 1 which houses a crank shaft 2 which drives a piston 7 via a connecting rod 4, a crosshead 5 and piston rod 6. The piston rod 6 is guided in a guide for the crosshead 5 as well as in a straight guide 8. In addition, the piston rod 6 is sealingly mounted in a piston rod seal or bush 9, as is known, for example, in a plurality of labyrinth graphite rings.

The piston 7 is further disposed concentrically within a cylinder 10 in spaced circumferential relation so as to avoid physical contact therewith. The cylinder 10 communicates with a compression chamber 11 about the piston 7 to which an inlet duct 13 and a delivery duct 15 are connected by suitable inlet and outlet valves 12, 14 respectively.

Referring to FIG. 2, the piston 7 has a number of sealing rings 20, the outer peripheries of which are provided with labyrinths. These sealing rings 20 alternate with rings 21 which are situated on a bush 22 surrounding the piston 7 and which engage over the labyrinth sealing rings 20 by means of shoulders and thus define the outside diameter of the sealing rings 20. The bush 22 also carries a conical ring 23 on the bottom end which serves to center the piston 7 aerodynamically when the compressor is in operation.

The piston 7 also carries a split ring 25 near the top. This split ring 25 has a plurality of axial grooves 26 in the outer periphery which communicate the two end faces of the ring 26 in order to equalize the pressures above and below the ring 26. Holes 30 are also provided in the grooves 26 for pressure equalization between the inside and the outside of the ring 25. The ring 25, which is made, for example, of polytetrafluoroetylene such as Teflon, is axially retained on the piston 7 by way of a bush 28 and a nut 29 which secures the bush 28 in place. The ring 25 serves to guide the piston 7 on starting when he gas pressure is inadequate for automatic centering of the piston 7.

Figure 4:
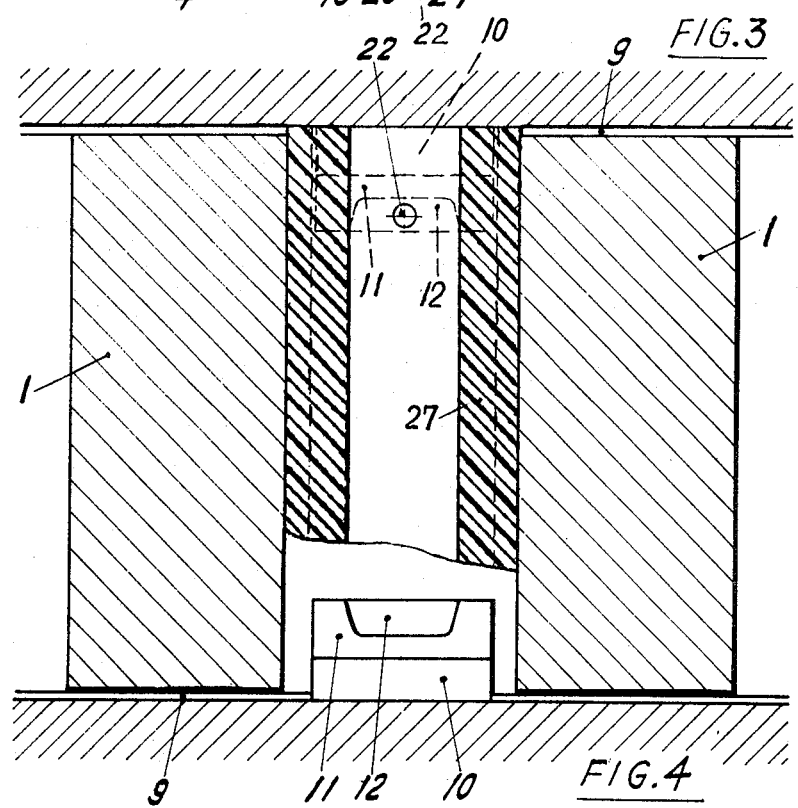
FIG. 4 illustrates a fragmentary sectional view through the swirl imparting means.

In order to impart a swirl to the gas passing downwardly as viewed between the piston 7 and cylinder 10, the conical ring 23 at the bottom end of the piston 7 has a plurality of helical grooves 32 of rectangular cross-section (cf. FIGS. 3 and 4) formed in the outer wall in facing relation to the cylinder 10.

These grooves 32 impart a swirl to the gas flowing down from between the piston 7 and cylinder 10 from the compression chamber 11, so that the gas flows helically around the piston rod 6 (as shown by the arrow 40 in FIG. 2) after leaving the grooves 32. Thus, the piston rod 6 is heated substantially uniformly rather than being heated on one side only. This prevents the piston 7 from coming into contact with the wall of the cylinder 10 and, as a result, wear on the piston and/or the cylinder is avoided. The gas flowing helically around the piston rod 6 flows back into the inlet duct 13 via a line 33 connected to the compressor casing 1 above the seal 9.

In order to enhance a uniform flow around the piston rod 6, an annular duct 34 is formed in the ring 23 upstream of the grooves 32 as considered in the direction of flow of the escaping gas. This annular duct 34 uniformly distributes the gas to the grooves 34 disposed over the periphery.

Referring to FIG. 5, the piston 7 can alternatively be made solid with a generatrix or outer surface 20' formed with labyrinths which carry out the sealing function between piston 7 and cylinder 10. This solid piston 7 is also formed with an integral conical portion 23' near the bottom end for self-centering the piston 7. Also, instead of a guide ring, the top end of the piston 7 is provided with a second conical portion 35 for self-centering of the piston 7. An annular duct 34 is provided in the bottom end below the conical portion 23' in order to distribute the gas flow to a plurality of grooves 32, as above, which impart a swirl to the gas.

In operation, on the upward movement of the piston, i.e. the compression stroke, some gas flows out of the compression chamber 11 along the cylinder wall 10 into the annular duct 34 and is distributed uniformly to the swirl-imparting grooves 32. The gas then leaves the grooves 32 with a swirling movement, so that the piston rod 6 connected to the piston 7 is subjected to uniform heating.

In the compressor described, the swirl-imparting grooves are situated on the piston. Alternatively, the swirl-imparting means may be provided near the bottom of the piston in the piston rod, e.g. in the form of swirl-imparting grooves formed in a corresponding thickened portion of the piston rod, or by means of a separate ring which is provided with swirl-imparting grooves and which is secured to the piston rod, an annular duct being left free between the piston and the ring.

Alternatively, instead of grooves formed in the generatrix of the piston, the portion bounded by the generatrix may be formed with inclined holes which are distributed around the periphery of the piston and which impart a swirl to the gas.

What is claimed is:

1. In a piston compressor having a cylinder, a reciprocally mounted piston disposed within said cylinder in spaced annular relation, and a piston rod secured to said piston for driving of said piston; a labyrinth sealing means circumferentially mounted on said piston in spaced concentric relation to said cylinder, and means for imparting a swirl to a flow of gas passing from between said piston and said cylinder, said means being disposed between said labyrinth sealing means and said piston rod.

2. In a piston compressor as set forth in claim 1 wherein said swirl imparting means is mounted within a ring.

3. In a piston compressor as set forth in claim 1 in which said swirl imparting means comprises a ring between said labyrinth sealing means and said piston rod, and a plurality of helical grooves in said ring in facing relation to said cylinder.

4. In a piston compressor as set forth in claim 3 which further includes an annular duct in said ring upstream of said grooves relative to the flow of gas for distributing the gas flow substantially uniformly into said grooves.

5. In a piston compressor as set forth in claim 1 wherein said swirl imparting means includes a plurality of helical grooves in said piston in facing relation to said cylinder.

6. In a piston compressor as set forth in claim 1 which further includes an annular duct upstream of said means relative to the flow of gas for distributing the gas flow substantially uniformly into said swirl imparting means.

* * * * *